(12) United States Patent
Hagen et al.

(10) Patent No.: US 11,734,666 B2
(45) Date of Patent: Aug. 22, 2023

(54) PHYSICAL SHOPPING CHART-TO-MOBILE DEVICE ASSOCIATIONS

(71) Applicant: Target Brands, Inc., Minneapolis, MN (US)

(72) Inventors: Todd A. Hagen, Minneapolis, MN (US); Josh Michael Dingman, Minneapolis, MN (US); Daniel Woods, Minneapolis, MN (US); Donald John Armstrong, Minneapolis, MN (US); Tomas Kadlec, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 166 days.

(21) Appl. No.: 17/345,757

(22) Filed: Jun. 11, 2021

(65) Prior Publication Data
US 2021/0342812 A1    Nov. 4, 2021

Related U.S. Application Data

(63) Continuation of application No. 16/263,937, filed on Jan. 31, 2019, now Pat. No. 11,080,680.
(Continued)

(51) Int. Cl.
*G06Q 20/32* (2012.01)
*G06Q 30/0601* (2023.01)
(Continued)

(52) U.S. Cl.
CPC ....... *G06Q 20/3224* (2013.01); *B62B 5/0096* (2013.01); *G06Q 20/047* (2020.05);
(Continued)

(58) Field of Classification Search
CPC ............. G06Q 20/3224; G06Q 20/047; G06Q 20/202; G06Q 20/322; G06Q 20/325;
(Continued)

(56) References Cited

U.S. PATENT DOCUMENTS

| 4,071,740 A | 1/1978 | Gogulski |
| 5,361,871 A | 11/1994 | Gupta et al. |

(Continued)

OTHER PUBLICATIONS

Geekwire.com [online], "How 'Amazon Go' works: The technology behind the online retailer's groundbreaking new grocery store," Dec. 5, 2016, [retrieved on Jul. 20, 2017], retrieved from : URL <https://www.geekwire.com/2016/amazon-go-works-technology-behind-online-retailers-gro>, 10 pages.

(Continued)

*Primary Examiner* — Peter Ludwig
(74) *Attorney, Agent, or Firm* — Barnes & Thornburg LLP

(57) ABSTRACT

In some implementations, a system for providing and managing associations between mobile computing device and physical shopping carts used in retail stores includes a physical shopping cart configured to transport physical goods around a store. The physical shopping cart includes a product detection system that is programmed to detect products that are placed in the physical shopping cart, a wireless transceiver to wirelessly communicate with other devices, and a cart identifier that uniquely identifies the physical shopping cart. The system further includes a mobile computing device that is programmed (i) to obtain the cart identifier for the shopping cart, (ii) to establish an association with the physical shopping cart using the cart identifier, and (iii) once the association between the physical shopping cart and the mobile computing device has been established, to output a user interface that provides a real-time summary of the products in the physical shopping cart.

19 Claims, 11 Drawing Sheets

Related U.S. Application Data

(60) Provisional application No. 62/624,243, filed on Jan. 31, 2018.

(51) Int. Cl.
*G06Q 20/20* (2012.01)
*G06Q 20/04* (2012.01)
*B62B 5/00* (2006.01)
*G07G 1/00* (2006.01)

(52) U.S. Cl.
CPC ......... *G06Q 20/202* (2013.01); *G06Q 20/322* (2013.01); *G06Q 20/325* (2013.01); *G06Q 30/0635* (2013.01); *G06Q 30/0641* (2013.01); *G07G 1/0081* (2013.01)

(58) Field of Classification Search
CPC ............ G06Q 30/0635; G06Q 30/0641; B62B 5/0096; G07G 1/0081
See application file for complete search history.

(56) References Cited

U.S. PATENT DOCUMENTS

| | | | |
|---|---|---|---|
| 5,729,697 | A | 3/1998 | Schkolnick et al. |
| 5,773,954 | A | 5/1998 | VanHorn |
| 5,939,695 | A | 8/1999 | Nelson |
| 6,032,127 | A | 2/2000 | Schkolnick et al. |
| 6,484,939 | B1 | 11/2002 | Blaeuer |
| 6,928,343 | B2 | 8/2005 | Cato |
| 6,997,382 | B1 | 2/2006 | Bhri |
| 7,225,980 | B2 | 6/2007 | Ku et al. |
| 7,741,808 | B2 | 6/2010 | Fowler et al. |
| 7,934,647 | B1 | 5/2011 | Mims et al. |
| 7,953,606 | B2 | 5/2011 | Shiraski |
| 8,120,190 | B2 | 2/2012 | Bravo |
| 9,607,486 | B2 | 3/2017 | Acker et al. |
| 10,315,679 | B1 | 6/2019 | Robell |
| 2004/0026503 | A1* | 2/2004 | Gantz ................. G07G 1/0054 235/383 |
| 2004/0249717 | A1 | 12/2004 | Shiraski |
| 2008/0012227 | A1 | 5/2008 | Hammerle |
| 2008/0243626 | A1 | 10/2008 | Stawar et al. |
| 2009/0058357 | A1 | 3/2009 | Saker et al. |
| 2009/0140850 | A1* | 6/2009 | Kangas ................. G07G 1/0081 345/173 |
| 2009/0231135 | A1 | 9/2009 | Chaves et al. |
| 2011/0060652 | A1 | 3/2011 | Morton |
| 2011/0084659 | A1 | 4/2011 | Neiemann et al. |
| 2011/0295704 | A1 | 12/2011 | Edwards |
| 2012/0049539 | A1 | 3/2012 | Sanvik |
| 2012/0284132 | A1* | 11/2012 | Kim ....................... G06Q 20/18 235/375 |
| 2012/0296751 | A1* | 11/2012 | Napper ................ G06Q 20/208 705/23 |
| 2014/0350710 | A1 | 11/2014 | Gopalakrishnan et al. |
| 2014/0350715 | A1 | 11/2014 | Gopalakrishnan et al. |
| 2015/0006319 | A1* | 1/2015 | Thomas ............. G06Q 30/0633 705/26.8 |
| 2015/0012396 | A1 | 1/2015 | Puerini et al. |
| 2015/0019391 | A1 | 1/2015 | Kumar et al. |
| 2016/0260161 | A1 | 9/2016 | Atchley et al. |
| 2017/0076354 | A1 | 3/2017 | High et al. |
| 2017/0161703 | A1* | 6/2017 | Dodia .................. G07G 1/0072 |
| 2017/0228811 | A1 | 8/2017 | Moreau et al. |
| 2017/0300980 | A1* | 10/2017 | Soldate ................ H04W 88/02 |
| 2018/0260612 | A1* | 9/2018 | Richards .............. G07G 1/0009 |
| 2018/0315011 | A1* | 11/2018 | Clarke ................ G06Q 20/3224 |
| 2019/0057435 | A1* | 2/2019 | Chomley .......... G06F 18/24133 |
| 2019/0139066 | A1 | 5/2019 | Bryan et al. |
| 2019/0251619 | A1* | 8/2019 | Kuchenski ......... G06Q 30/0639 |
| 2019/0318417 | A1* | 10/2019 | Gumaru ............. G06Q 30/0635 |

OTHER PUBLICATIONS

Hellenschmidt & Kamieth, "BERNIE—Consultant for Nutrition and Intelligenct Shopping,"Communications in Computer and Information Science, 2007, 11:28-239.
https://www.pynnnts.conn/intelligence-of-things/2017/can-iot-based-carts-lure-online-shoppers-out-of-hibernation/ (Year: 2017).
Lauzon et al, "Point Of Sale Grocery Cart," Michigan State College of Engineering, 2014, 69 pages.
rfidarena.com [online], "RFID shopping-cart level checkout is possible with technology that is available today,"[retrieved on Jul. 20, 2017], retrieved from : URL <http://www.rfidarena.com/2014/5/15/rfid-shopping-cart-level-checkout-is-possible-with-te/>, 12 pages.
Tesco.com [online], "Scan as you Shop,"[retrieved on Jul. 20, 2017], retrieved from : URL <https://www.tesco.com/scan-as-you-shop/>, 7 pages.

* cited by examiner

US 11,734,666 B2

PHYSICAL SHOPPING CHART-TO-MOBILE DEVICE ASSOCIATIONS

CROSS-REFERENCE TO RELATED APPLICATIONS

This application is a continuation of U.S. application Ser. No. 16/263,937 filed Jan. 31, 2019 that claims the benefit of U.S. Provisional Application Ser. No. 62/624,243, filed Jan. 31, 2018. The disclosure of the prior application is considered part of (and is incorporated by reference in) the disclosure of this application.

TECHNICAL FIELD

This document generally relates to physical shopping carts that are used in physical retail stores and other shopping establishments, and to the association of mobile computing devices with such physical shopping carts.

BACKGROUND

Physical shopping charts have been used in retail stores and a variety of other shopping establishments (e.g., grocery stores, home improvement stores) to provide customers with a way to collect and transport items to a check-out area (e.g., point of sale terminal, cashier). Although physical shopping carts have a variety of different form factors and configurations, physical shopping carts generally include a frame, an area for the placement of items (e.g., basket, bin, platform), and a handle or other mechanism for customers to move the cart around. Physical shopping carts can include wheels on which the frame is mounted to permit the cart to be pushed around a store. Alternatively, physical shopping carts can include a handle or other mechanism permitting users to carry carts around a store.

SUMMARY

This document generally describes technology for providing physical shopping carts with product detection systems and associating physical shopping carts with mobile computing devices (e.g., smartphones, tablet computing devices, smart watches, wearable computing devices). For example, physical shopping carts can be equipped with one or more product detection systems (e.g., scanners, sensors, cameras) that can electronically tally products that are placed in physical shopping carts. Mobile computing devices can be associated with physical shopping carts to provide a variety of enhanced shopping cart features not possible with conventional physical shopping carts, such as electronically tracking the contents of a shopping cart, checking-out from the mobile computing device (instead of at conventional check-out areas, such as point of sale terminals), and others. Mobile computing devices can be associated with physical shopping carts in any of a variety of ways, such as through a computer system (e.g., cloud-based server system) that is in communication with both mobile computing devices and physical shopping carts and/or through a direct wireless pairing of a mobile computing device to a physical shopping cart. Other techniques for associating mobile computing devices and physical shopping carts are also possible.

In some implementations, a system for providing and managing associations between mobile computing device and physical shopping carts used in retail stores includes a physical shopping cart that is configured to transport physical goods around a store. The physical shopping cart includes a product detection system that is programmed to detect products that are placed in the physical shopping cart, a wireless transceiver to wirelessly communicate with other devices, and a cart identifier that uniquely identifies the physical shopping cart. The system further includes a mobile computing device that is programmed (i) to obtain the cart identifier for the shopping cart, (ii) to establish an association with the physical shopping cart using the cart identifier, and (iii) once the association between the physical shopping cart and the mobile computing device has been established, to output a user interface that provides a real-time summary of the products in the physical shopping cart.

Some implementations can further include one or more of the following features. The system can further include a remote server system to manage associations between physical shopping carts and mobile computing devices. The remote server system can include a cart-to-device association database that stores current cart-to-device associations between physical shopping carts and mobile computing devices. The remote server system can be programmed (i) to receive an association request from the mobile computing device that includes the cart identifier for the physical shopping cart and an identifier for the mobile computing device, (ii) to query the cart-to-device association database to determine whether the physical shopping cart is free to be associated with the mobile computing device, and (iii) in response to determining that the shopping cart is free to be associated with the mobile computing device, to add the association between the mobile computing device and the physical shopping cart to the cart-to-device association database. The remote server system can further include a cart contents database that stores product records of products that are currently contained in physical shopping carts. The wireless transceiver of the physical shopping cart can be programmed to transmit product information for the products detected by the product system to the remote server system. The remote server system can further be programmed (i) to identify the products contained in the physical shopping cart using the product information, (ii) to update the product records for the physical shopping cart based on the identified products, and (iii) to transmit current cart contents for the physical shopping cart to the mobile computing device based on the association between the physical shopping cart and the mobile computing device stored in the cart-to-device association database. The mobile computing device can further be programmed (i) to receive the current cart contents from the remote server system and (ii) to update the real-time summary of the products in the physical shopping cart in the user interface using the current cart contents received from the remote server system. The real-time summary can include graphical elements identifying the products that are currently contained in the physical shopping cart, quantities of the products, and prices of the products, and a graphical element providing a total price for the products contained in the physical shopping cart. The user interface can further include a selectable element to checkout on the mobile computing device for the products contained in the physical shopping cart. Selection of the selectable element can cause the mobile computing device to initiate a checkout process with the remote server system and, once the checkout process has been completed, to output a checkout confirmation on the mobile computing device to verify that payment for products contained in the physical shopping cart has been received by the remote server system. The checkout process can be performed without a user of the mobile computing device using a point of sale terminal at a store where the physical shopping cart is located. At least some of the product information can be provided to the remote server system without a confirmed product identification and the remote server system processes the product information to determine an accurate product identification.

The remote server system can further be programmed (i) to receive status information for, at least, the mobile computing device and (ii) to break the association between the mobile computing device and the physical shopping cart based on analysis of the status information. The status information can include confirmation that the mobile computing device having completed a checkout process for the physical shopping cart. The remote server system can break the association in response to receiving the confirmation of the completed checkout process. The status information can include confirmation that the mobile computing device has physically left a geofenced area that is associated with a store where the physical shopping cart is located. The remote server system can break the association in response to receiving the confirmation that the mobile computing device has left the geofenced area. The status information can include information indicating an amount of time that has elapsed since the mobile computing device was physically proximate to the physical shopping cart. The remote server system can break the association in response to determining that the mobile computing device has been physically separated from the physical shopping cart for greater than a threshold period of time based on the amount of time. Breaking the association can cause the association to be removed from the cart-to-device association database and for product information for the physical shopping to no longer be transmitted by the remote server system to the mobile computing device.

The association can be established by the remote server system without communication between the mobile computing device and the physical shopping cart. The association can be established by the remote server system based on wireless communication between the mobile computing device and the physical shopping cart. The wireless communication can include a wireless pairing between the mobile computing device and the physical shopping cart. The cart identifier can include a physical marking on one or more surfaces of the physical shopping cart. The mobile computing device can be programmed to optically obtain the cart identifier using one or more digital cameras that are part of the mobile computing device. The physical marking can include a barcode or a QR code. The cart identifier can include an RFID tag that is affixed to or embedded within one or more structures of the physical shopping cart. The mobile computing device can be programmed to obtain the cart identifier using a wireless transceiver that is part of the mobile computing device. The cart identifier can include a digital data is stored in non-volatile memory on the physical shopping cart. The mobile computing device can be programmed to obtain the cart identifier through wireless communication with the physical shopping cart via the wireless transceiver of the physical shopping cart. The wireless communication can include a wireless pairing between the mobile computing device and the wireless transceiver of the physical shopping cart. The mobile computing device can include a smartphone. The physical shopping cart can include a retail shopping cart that includes wheels, a product basket or bin, and a handle. The product detection system can automatically detect products that are placed in the physical shopping cart and can include a collection of one or more of the following: sensors, cameras, and scanners. The product detection system can be manually operated and can include a barcode scanner device that is tethered to the physical shopping cart.

The systems, devices, program products, and processes described throughout this document can, in some instances, provide one or more of the following advantages. By associating physical shopping carts with mobile computing devices, enhanced shopping features can be provided to users. For example, users can receive a running tally of the items that have been placed in their shopping carts, including a total cost of the items in the cart. With conventional shopping carts, users often did not have a clear idea of the total cost of items in a shopping cart until they went through the checkout process because manually tracking the cost of all items in the cart (and taking into account discounts, sales, applicable taxes, etc.) was tedious. With cart-to-mobile device associations, a running tally of not only the contents of the shopping cart can be presented to the user in real time as the user progresses through a store, but a total cost of the items in the cart can be presented to a user (including discounts, sales, applicable taxes, etc.). This can make the shopping process more efficient for consumers, can help consumers with budgeting, and can help consumers adhere to shopping lists and other consumer planning.

In another example, other enhanced shopping features that can be provided include the ability for users to complete the checkout process on their mobile computing devices without having to go to a checkout area (e.g., checkout lane, point of sale terminal, self-checkout system). This can save users time and simplify the shopping process, particularly during busy shopping periods within retail stores when waiting in line for either a cashier or an available self-checkout terminal can be customary.

In another example, enhanced shopping features provided by cart-to-mobile device associations also include the ability for users to verify not only that the item placed in a cart was correctly identified, but also that the price associated with the item is correct. For example, when there are many similar items on a store shelf (e.g., same product with different package sizes), it may be difficult to identify the specific price that is associated with each item. Cart-to-mobile device associations can permit for pricing information for each item placed in a cart to be verified on a user's mobile computing device, which can resolve ambiguity and uncertainty for users. Additionally, it can help users understand whether any sales or discounts apply to particular items, and to resolve any discrepancies between advertised and presented pricing.

In another example, cart-to-device associations can be established and maintained by a computer system (e.g., cloud-based computer system), which can account for separation between a user and a cart in both time and space. By using a computer system to manage cart-to-device based associations (instead of relying on direct cart-to-device wireless pairings, for example), a cart can stay associated with a mobile computing device even if the mobile computing device is separated from the cart (e.g., outside of wireless communication range) for a period of time. For instance, a user may place a couple items in a shopping cart, but then park the shopping cart in a particular location for a while with the intention of returning to the cart later to complete the shopping trip (e.g., leave the cart in an uncrowded part of the store to avoid traffic jams when venturing into a more crowded area of the store, leave the cart with one person while others in the group go to different parts of the store, leave the cart to run another errand within the store, such as a wellness checkup, a bathroom break, a meal). By using a computer system to manage cart-to-device associations, associations can be maintained regardless of separations in distance and time between a mobile device and the associated cart.

In another example, cart-to-device associations that are provided via a networked platform (e.g., cloud based platform) permit multiple users to shop together (e.g., a couple, friends) with a shared digital shopping cart. For instance, a networked platform can permit multiple users to share a cloud-based digital cart so that users can physically split up in the store, pickup, and scan items into separate physical shopping carts that would appear in the same digital shopping cart that is shared across the multiple users and the multiple carts. This would allow multiple users to share a common cloud cart and have a single payment step, if desired. Additional and/or alternative co-shopping and/or group shopping can also be provided.

In another example, cart-to-device associations permit for shopping carts with product detection systems to leverage the prevalence of mobile computing devices, such as smartphones, in society to provide enhances shopping features without requiring display screens and other user interface features on the shopping cart itself. For example, incorporating displays, keypads, and other user interface features onto a shopping cart can add complexity and cost to shopping cart, which can be a barrier to actually deploying the shopping carts in a retail environment, to users being able to use the carts, and to the durability of the shopping carts (e.g., carts with displays being left outside in the rain, cold, and heat may require more frequent repair and maintenance). In contrast to an embedded display solution (i.e., shopping cart with a display incorporated onto the cart), shopping carts can be associated with mobile computing devices that users carry with them (e.g., smartphones) to provide the enhanced shopping features without the drawbacks of an embedded solution. For example, the near-total adoption of smartphones and other mobile computing device technology in society means that nearly every person (or group) entering a retail store brings with them a device with a display and user interface features. By associating these mobile computing devices with shopping carts that are equipped to detect products that have been added to the cart, enhanced shopping features can be seamlessly provided to users on their mobile devices and without the need for an embedded display solution. This can permit more widespread deployment of shopping carts with product detection systems and enhanced shopping cart features.

In another example, cart-to-device associations provide users with the ability to readily verify the quantity of items in the shopping cart by simply looking at the user interface on the mobile device. This is an improvement over traditional physical shopping experiences, in which a user would physically locate and tally items in the cart to determine the quantity of items that the user current has. In contrast, cart-to-device associations permit a user to readily determine the quantity of items in the cart without any physical actions related to the items (e.g., no physical identification and tallying of items). Cart-to-device associations also permit users to quickly and accurately modify/change quantities of items in the cart by, for example, physically adding or removing single items from the cart until the user interface reflects the desired number of items.

Additional Advantages
    Related to [0008] Association to cloud based platform would all multiple users shopping together (a couple or friends) to share a physical cart and a cloud based digital cart allows the two users to split up in the store, pickup, and both scan items that would land in the same digital cart and enable. This would allow multiple users to share a common cloud cart and have a single payment step if desired. Co-shopping or group shopping.

Other features, aspects and potential advantages will be apparent from the accompanying description and figures.

DESCRIPTION OF DRAWINGS

Like reference symbols in the various drawings indicate like elements

DETAILED DESCRIPTION

This document generally pertains to associating mobile computing devices with shopping carts to provide enhanced features to users related to the shopping cart. For example, a shopping cart can be equipped with a product detection system that is configured to automatically detect products that are placed in (and/or removed from) the shopping cart. The shopping cart can be equipped to, either directly or via an intermediary computer system (e.g., cloud based computer system) to convey this product information to the mobile computing device, which can permit a variety of enhanced features to be provided to users. For example, a current list of items in the shopping cart, including their quantities, pricing, discounts, and other details can be presented on an associated mobile computing device, which permit users to track the current tally of items in the cart, to verify pricing information, and to locally checkout on the mobile device without having to go to a checkout area of the retail store.

Figure 1:
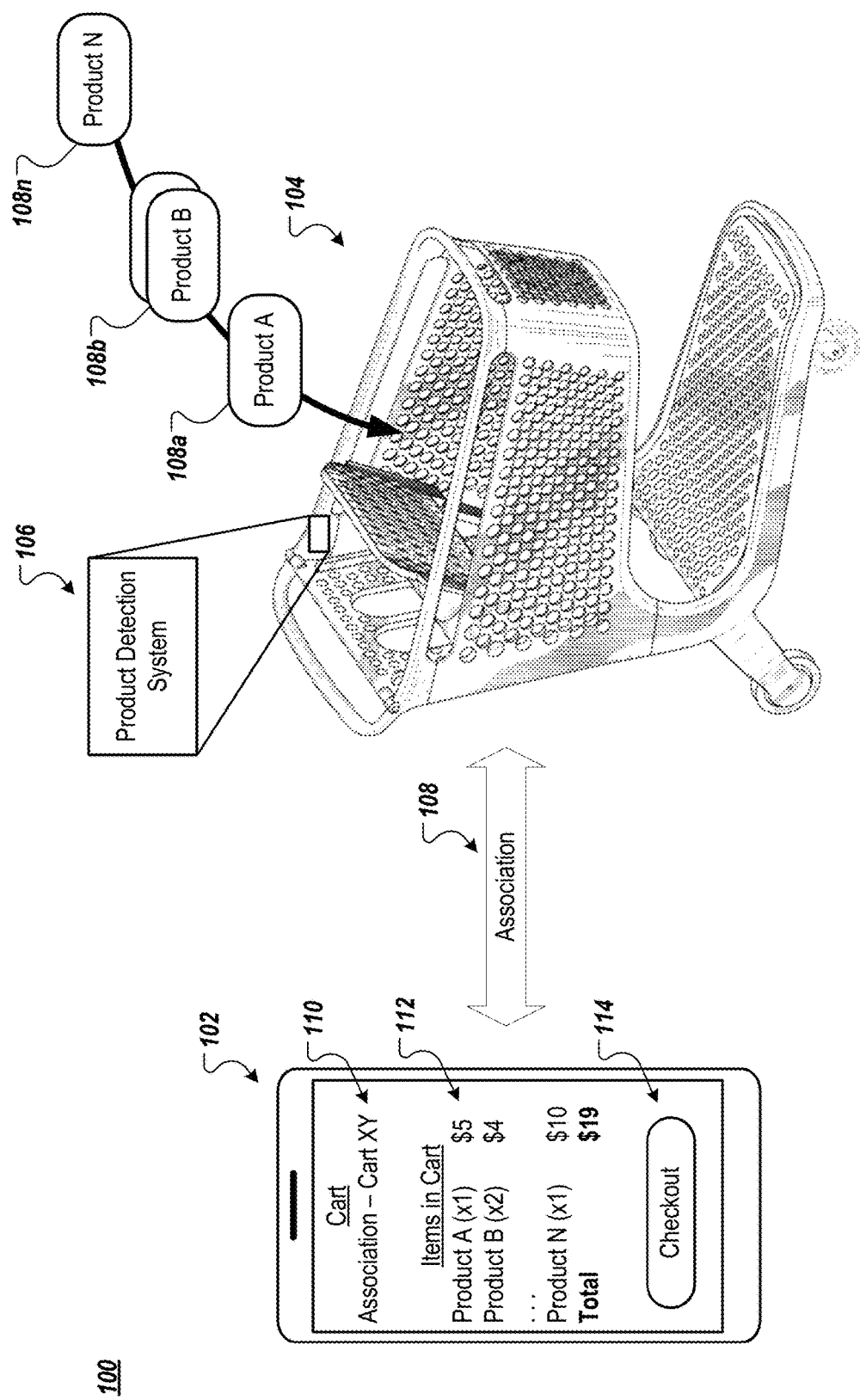
FIG. 1 is a conceptual diagram of an example system for associating an example mobile computing device with an example shopping cart.

FIG. 1 is a conceptual diagram of an example system 100 for associating an example mobile computing device 102 with an example shopping cart 104. The mobile computing device 102 can be any of a variety of mobile computing device with a display (and/or other mechanism to output information to a user) and user interface features (e.g., touchscreen, microphone with voice interface, keys, buttons), such as smartphones, smart watches, tablet computing devices, wearable computing devices, and/or others. The shopping cart 104 can be any of a variety of physical apparatus or device to assist users with gathering and/or transporting physical products around a retail store (e.g., brick and mortar store), such as a push-based cart with wheels (as depicted), a smaller shopping basket that users carry, and/or others.

The shopping cart 104 includes an example product detection system 106 that is configured to detect products 108*a-n* that are placed in the shopping cart 104. The product detection system 106 can be any of a variety of system to automatically (without user direction) or manually (with user direction) detect the products 108*a-n*. For example, the product detection system 106 can be a system that includes a collection of sensors, cameras, scanners, and/or other devices to automatically detect the products 108*a-n* as they are placed in (and removed from) the shopping cart 104. Such a product detection system 106 may perform automatic product detection locally (e.g., using a local computing device that is part of the local product detection system 106 on the shopping cart 104) and/or remotely through communication with a remote computer system (e.g., cloud computer system). For instance, the local product detection system 106 may collect signals from sensors, scanners, cameras, and/or other devices and transmit them to a remote computer system for processing and ultimate product identification. Such a configuration (local collection of product signals and transmission to a remote system for analysis and product detection) can permit for the local product detection system 106 on the shopping cart 104 to be simplified and to require fewer computing resources.

In another example, the product detection system 106 can be a scanner (e.g., barcode scanner, QR code scanner, RFID scanner) and/or other device that users can manually operate to obtain information identifying the products 108*a-n*. For example, the product detection system 106 can be a handheld scanner device attached to the shopping cart 104 that users can manually operate to scan the products 108*a-n* as they are placed in the cart 104. The scans can generate a unique identifier for the product (e.g., universal product code (UPC)) that can be used to lookup the product information, including the product description, price, sale information, etc.

The mobile computing device 102 can be associated with the shopping cart 104 can its product detection system 106, as indicated by the association 108. The association can be instantiated, maintained, and managed locally between the device 102 and the cart 104, and/or remotely by a computer server system, such as a cloud-based computer system that is accessible by both the mobile computing device 102 and the shopping cart 104. The shopping cart 104 can include one or more wireless transceivers that are able to communicate via short, medium, and/or long range wireless channels to communicate over one or more wireless networks (e.g., store-based wireless network, mobile data network, cellular network, point to point network with mobile computing device 102) with such a remote computer system and/or with the mobile computing device 102.

The association between the mobile computing device 102 and the shopping cart 104 can be established in any of a variety of ways. For example, in some instances the mobile computing device 102 can detect a unique identifier for the shopping cart 104 (e.g., QR code, barcode, RFID tag, MAC address) that the mobile computing device 102 transmits to a remote computer system to request the device 102 and the cart 104 be associated with each other. The remote computer system can evaluate whether the cart 104 is free to be associated with the mobile computing device 102 (e.g., check wither the cart 104 is currently associated with another device) and, if the cart 104 is free, can establish the association between the device 102 and the cart 104.

In another example, in some instances, the mobile device 102 can perform a wireless pairing operation (e.g., BLUETOOTH low energy (BLE) pairing, WiFi Direct pairing, near-field communication (NFC) pairing) with the shopping cart 104 to establish an association with the cart 104. For instance, the mobile device 102 can wirelessly pair with the product detection system 106, which can be a barcode scanner, for example. Such an association may be additionally conveyed to and managed by a remote computer system, which can ensure that the cart 104 is free to be associated with the mobile device 102.

Once the association 108 is established between the mobile computing device 102 and the cart 104, the products 108*a-n* that are detected by the product detection system 106 can be conveyed, either directly or indirectly, to and presented on the mobile computing device 102. An example user interface is presented on the device 102, which includes a section 110 confirming the association with the cart 104 (where "XY" is an example unique identifier for the cart 104) and a section 112 listing the products 108*a-n* that have been detected by the product detection system 106 along with their descriptions ("Product A"), quantities ("x1"), and price ("$5"), as well as a total tally for all of these products ("$19"). Additionally and/or alternate product information can be presented in the section 112. The user interface also includes a selectable feature 114 to initiate a checkout process on the mobile device 102, which can permit the user to pay for all of the items included in the cart 104, which are shown on the user interface in the section 112.

Once the checkout process on the mobile device 102 has been completed, the user may receive one or more instructions on the mobile device 102 to verify that payment has been processed for the cart 104 when exiting the store. For example, the mobile device 102 may present a payment verification code (e.g., QR code, barcode, unique alphanumeric string) that can be scanned by a person or machine at the store's exit to independently verify the payment with a remote computer system. In some instances, verification can also involve presenting the store's exit monitoring system, which may be manual and/or automatic, with information on products that were included in the processed payment, which can be used to verify whether the cart 104 includes any products that were not covered by the processed payment. Such verification can be a spot-check (e.g., look for presence of one or more particular items in the cart 104 from the processed payment) and/or a whole cart analysis (e.g., verify entire contents of cart 104 correllate to processed payment). In another example, a unique identifier on the cart 104 can be scanned (in addition to or instead of) scanning a code from the mobile device 102 to pull up information on the products contained in the cart 104 and to verify the processed payment at the store's exit. Other exit verification systems are also possible.

Figure 2:
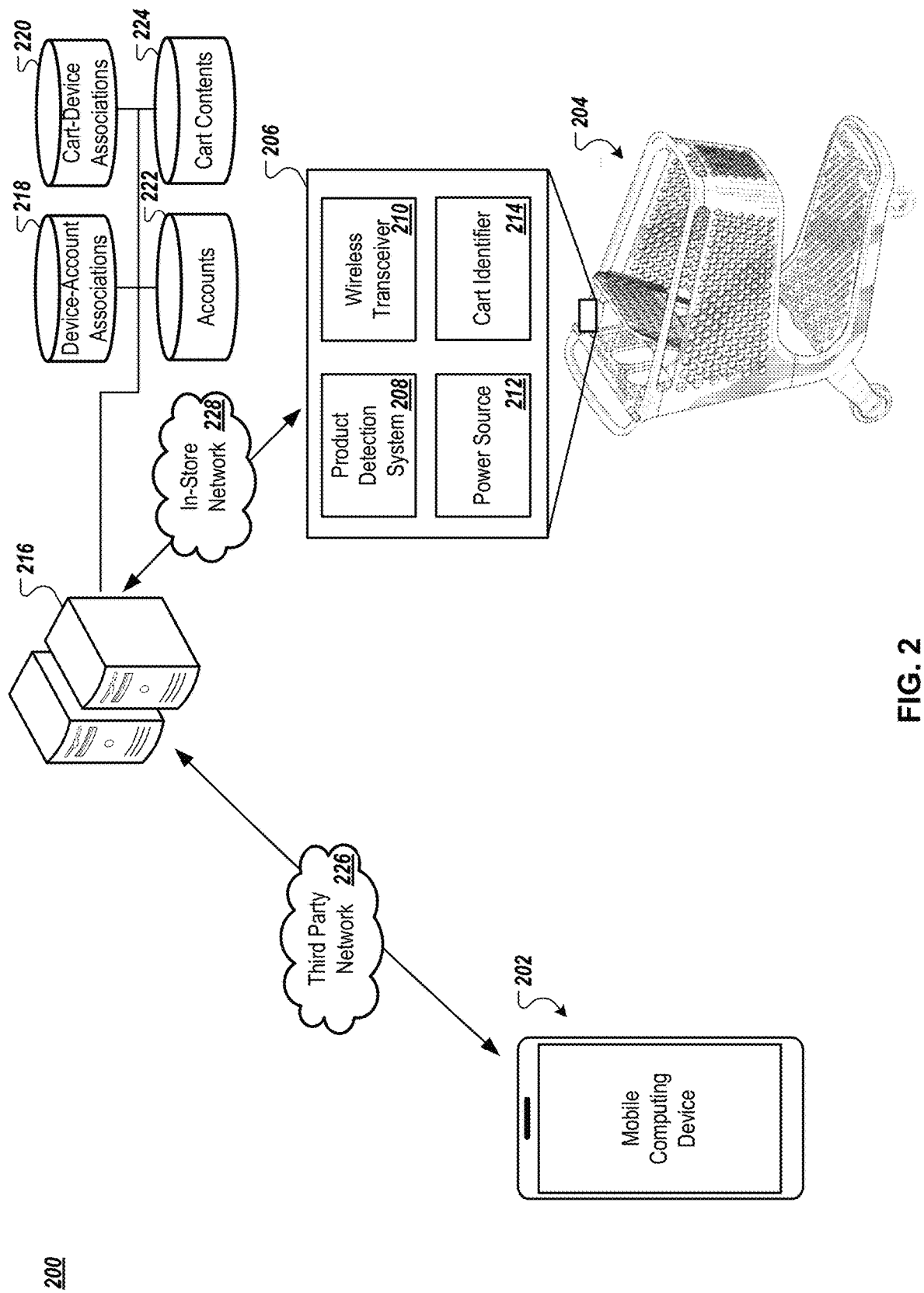
FIG. 2 is a conceptual diagram of an example system for associating an example mobile computing device with an example shopping cart using a computer system.

FIG. 2 is a conceptual diagram of an example system 200 for associating an example mobile computing device 202 with an example shopping cart 204 using a computer system 216. The mobile computing device 202 can be similar to the mobile computing device 102 described above with regard to FIG. 1, and the shopping cart 204 can be similar to the shopping cart 104 described above with regard to FIG. 1. The computer system 216 can be any of a variety of appropriate computer systems, such as a remote cloud-based server system, a store-based computer system, and/or combinations thereof.

In the example system 200, the mobile computing device 202 and the cart 204 establish an association through communication with the computer system 216. While the association between the mobile computing device 202 and the cart 204 can involve communication between the mobile computing device 202 and the cart 204, the association between them may be established alone by communication with the computer system 216.

The shopping cart 204 includes a system 206 to provide product detection and device association features. The system 206 includes a product detection system 208 to detect products that are placed in and/or removed from the cart 204 (similar to the product detection system 106 described above with regard to FIG. 1), a wireless transceiver 210 (e.g., Wi-Fi chipset, BLUETOOTH chipset, 4G LTE chipset, cellular network transceiver, NFC chipset) to wirelessly transmit and receive information, a power source 212 (e.g., battery system, local power generation device) to supply power to the product detection system 208 and the wireless transceiver 210, and a cart identifier 214 that uniquely identifies the cart 204. The cart identifier 214 can be a label, marking, and/or other information that is physically affixed/provided on one or more surfaces of the cart 204. For example, the cart identifier 214 can be a QR code that is affixed to on one or more surfaces of the cart 204, such as near the handle area of the cart 204, that can readily be captured by a camera of the mobile computing device 202. The cart identifier 214 can, additionally and/or alternatively, be a value that is wirelessly detectable by the mobile computing device 202, such as an RFID tag that is embedded in the cart 204, an identifier that is wirelessly transmitted by the cart 204 (e.g., transmitted via wireless beacon, transmitted via NFC connection), and/or other wireless transmission techniques.

In the example system 200 that is depicted, cart 204 communicates with the computer system 216 via an in-store communications network 228 (e.g., Wi-Fi network, BLE network) that is based in the store where the cart 204 is located. The in-store network 228 can be a private/secured network that is not open to the public generally (i.e., devices without network credentials or a passcode). In contrast, the mobile computing device 202 can communicate with the computer system 216 via one or more third party networks 226 that are different from the in-store network 228. Such third-party networks 226 can include, for example, a mobile data network (e.g., 4G LTE network) to which the mobile computing device 202 subscribes, cellular networks, other wireless networks (e.g., open/public Wi-Fi networks within a store), and/or combinations thereof. Although not depicted, in some instances the cart 204 and the mobile computing device 202 can communicate with the computer system 216 over the same network.

The computer system 216 manages device-to-cart associations and the enhanced features that are associated therewith using several different databases 218-224. An account database 222 includes user account information, including preapproved payment methods (e.g., stored credit card information, stored bank account information), contact information (e.g., phone number, email address), preferences (e.g., text messages preferred), name (e.g., first and last name), account identifier (e.g., username), login information (e.g., password, login credentials, certificate), and/or other information. The information stored in the account database 222 can be used for a variety of tasks, including processing a checkout request from the mobile computing device 202 to checkout for items in the cart 204.

A device-to-account association database 218 stores information correlating particular user accounts to particular mobile computing devices. For example, a user may have three different mobile devices (e.g., smartphone, tablet, smartwatch) that each have installed a mobile application to provide enhanced cart-related features on the mobile devices. The device-to-account association database 218 can provide entries that link each of these three different mobile computing devices to the same user account from the accounts database 222. Devices can be identified in these entries by a unique identifier that uniquely identifies the devices, such as MAC address for the device, a unique device identifier generated by the computer system 218 and stored on the device 202, and/or others. Entries in the device-to-account association database 218 can be created when, for example, a user logs in on the device 202, as verified by the computer system 216.

A cart-to-device association database 220 can store the associations between the cart 204 and the device 202. These associations can be created in any of a variety of ways, as discussed above and below with regard to FIG. 3. For example, the mobile computing device 202 to perform a barcode/QR code scan on the cart 204 to obtain the cart identifier 214, which can be transmitted to the computer system 216. The computer system 216 can query the cart-to-device association database 220 to determine whether the cart 204 is free to be associated with the device 202, and if so, can create an entry in the database 220 for the new association between the device 202 and the cart 204.

A cart contents database 224 stores the contents of the cart 204 based on products detected by the product detection system 208. The cart contents database 224 can store entries in association with the cart identifier 214, which then then be correlated to an associated device 202 using entries in the cart-to-device associations database 220 and to a corresponding user account (stored in the accounts database 222) for the device 202 using the entries in the device-to-account associations database 218. These associations can be used to ensure that the correct cart contents 224 for the cart 204 are being transmitted to and presented on the associated device 202 and that payment is being processed for the correct user account associated with the device 202.

Figure 3:
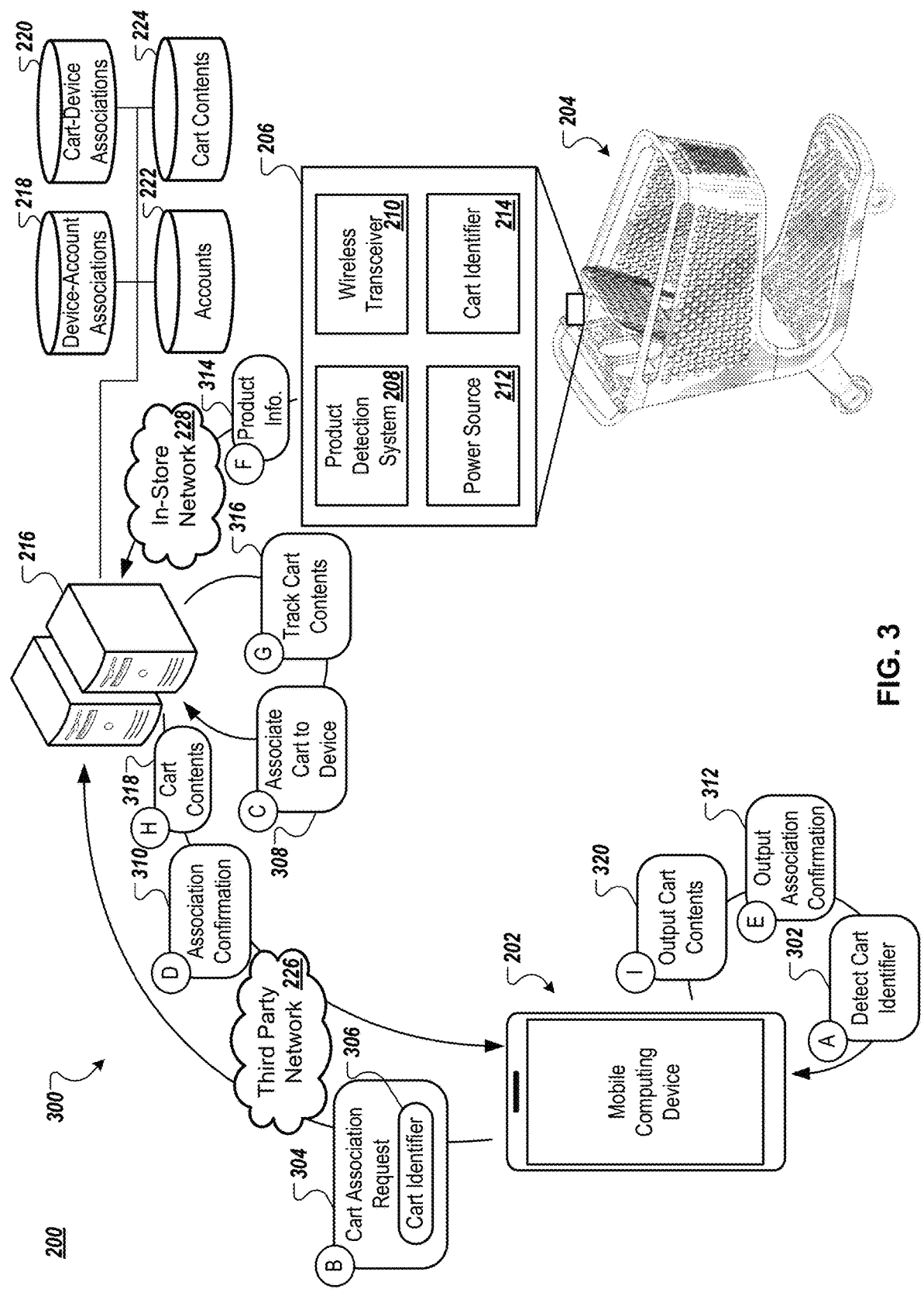
FIG. 3 is an example process flow for associating an example mobile computing device with an example shopping cart in the system depicted in FIG. 2.

FIG. 3 is an example process flow 300 for associating the device 202 with the cart 204 in the system 200 depicted in FIG. 2.

Referring to step A (302), the mobile computing device 202 detects the cart identifier 214 for the cart 204. Detection of the cart identifier 214 can be performed by the mobile computing device 202 in any of a variety of ways. For example, a user of the mobile computing device 202 can select an option to scan a code (e.g., barcode, QR code) on the cart 204 on a mobile app that is running on the device 202, and can then be presented with a screen to grab an image of the code providing the cart identifier 214. In another example, a user of the mobile computing device 202 can select an option to obtain the cart identifier 214 wirelessly on a mobile app running on the device 202, and can be presented with instructions on how and where to place the device 202 relative to the cart 204 to obtain the cart identifier 214 wirelessly (e.g., RFID, NFC). Other options for obtaining the cart identifier 214 on the mobile computing device 202 are also possible.

Once the cart identifier has been obtained, the mobile device 202 can transmit a cart association request with the cart identifier 306 to the computer system 216 via the third party network 226, as indicated by step B (304). The request can additionally include information that uniquely identifies the device 202 on the computer system 216, which can be correlated to an entry in the device-account associations database 218.

The computer system 216 receives the request, queries the cart-device associations 220 to ensure that the cart 204 is free to be associated with the device 202, and, if it is free, can associate the cart 204 to the device 202, as indicated by step C (308). Associating the cart 204 to the device 202 can include, for example, creating an entry in the cart-to-device associations database 220 for the cart 202 and the device 204, which can include information identify the cart 204, the device 202, a timestamp for when the association was created, a store location for the cart 204, recent status information for the cart 204 and/or the device 202 (e.g., last time a product was detected on the cart 204, last time the mobile app on the device 202 received user input and/or had focus on the device 202), and/or other information for managing the cart-to-device associations. In the event that either the device 202 or the cart 204 are already identified in the database 220 has having a preexisting association with another cart or device, the computer system 216 can return that information to the mobile device 202 for presentation to the user. For example, if the device 202 is already associated with another cart, the user can be presented with an option on the device 202 to break that other association and to instead associate the device 202 with the cart 204. In another example, if the cart 204 is already associated with another device, the user may simply be presented with information indicating that this cart is already associated with another device. In some cases (e.g., preexisting association is old (e.g., greater than a threshold period of time), no recent activity related cart 204, few or no items in cart 204 based on the cart contents database 224), the user may be presented with an option to request that this preexisting association with another device and the cart 204 be broken, in which case the computing device 216 can contact the other device to which the cart 204 was already associated to obtain consent from that user to break the association. If that user provides approval or does not respond within a threshold amount of time (e.g., within 2 minutes, within 5 minutes, within 10 minutes), then the previous association can be broken and a new association between the device 202 and the cart 204 can be established. Other alternatives for determining cart-to-device associations are also possible.

Once the cart 204 has been associated with the device 202, a confirmation can be transmitted form the computer system 216 to the device 202, as indicated by step D (310), and output on the device 202, as indicated by step E (312). Now that the device 202 and the cart 204 are associated with each other, enhanced shopping features related to the cart 204 can be provided on the mobile computing device 202. For example, as products are placed in the cart 204, the product detection system 208 can obtain product information that it transmits to the computer system 216 via the in-store network 228, as indicated by step F (314). The product information can include, for example, information that directly and/or indirectly identifies the products. For example, the product information may include a UPC that directly identifies the product placed in the cart. In another example, the product information can include a partial image of product packaging that indirectly identifies the product placed in the cart (e.g., includes some information to identify the product, but possibly not enough to narrow down the product to a specific UPC).

The computer system 216 receives the product information from the cart 204 and uses it to track the contents of the cart 204, as indicated by step G (316). For example, the computer system 216 can use direct product information to identify particular products that are in the cart 204. The computer system 216 can also use combinations of indirect product information (e.g., images, RFID scans, sensor readings, cart location within a store) to identify specific products that have been placed in the cart 204. Product identification can be stored and maintained in the cart contents database 224 in association with the cart 204. As items are detected as being added to the cart 204, the computer system 216 can add the entries for the cart in the database 224. Likewise, when items are detected as being removed from the cart 204, the computer system can remove entries for the cart in the database 224.

The computer system 216 can transmit the cart contents to the computing device 202, as indicated by step H (318), which the mobile computing device 202 can output on its display, as indicated by step I (320). For example, as product are added to the cart 204, the computer system 216 can transmit corresponding product information for the items added to the cart 204 to the mobile device 202, which can add the items to the current cart content tally and to the total price for the cart. The cart content information can be transmitted 216 in real time to the mobile device 202, so that the mobile device 202 is able to present an up-to-date summary of the products contained in the cart 204.

Figure 4:
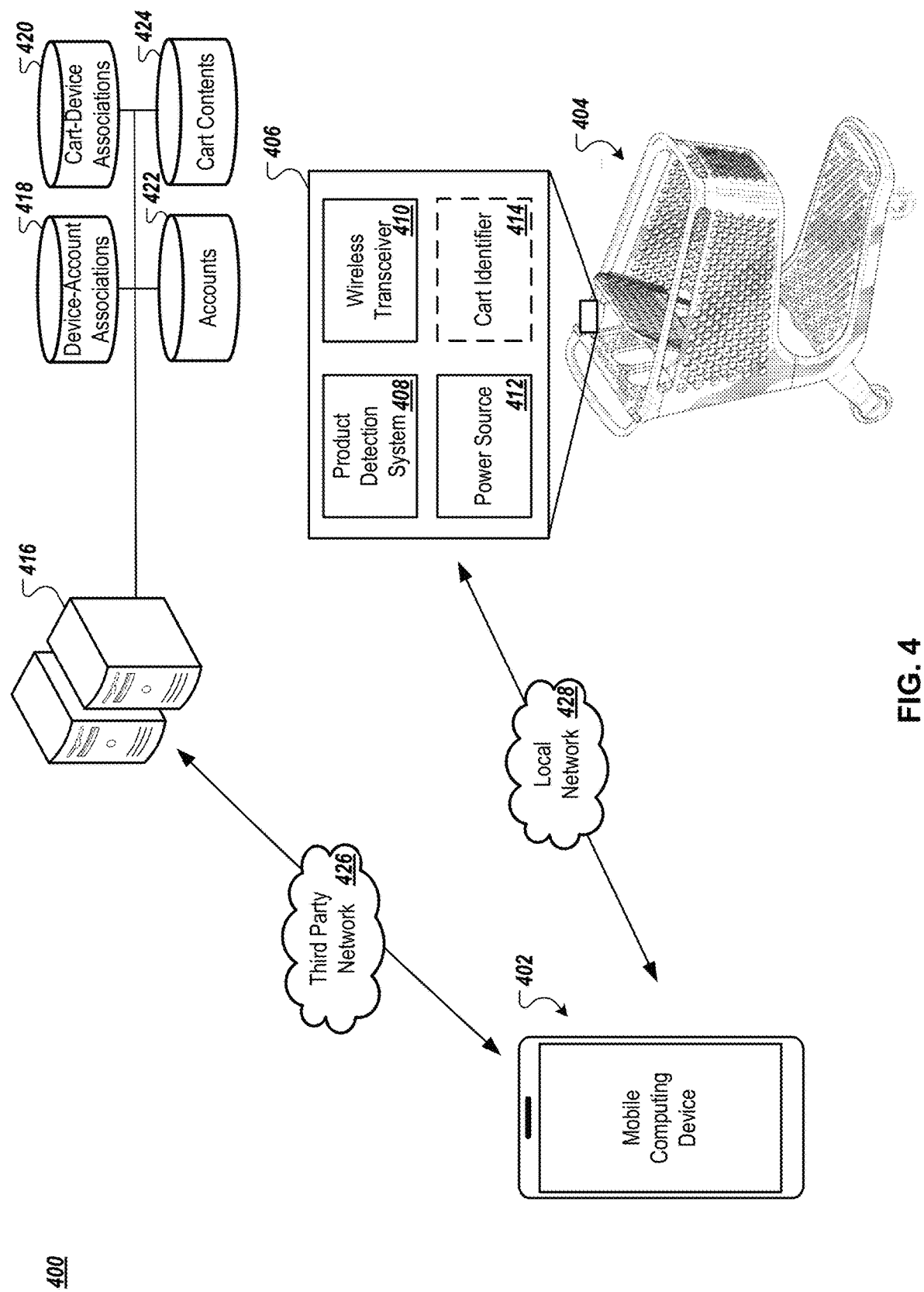
FIG. 4 is a conceptual diagram of an example system for associating an example mobile computing device with an example shopping cart over a local network.

Although not depicted in FIG. 3, the mobile computing device 202 can also be used to checkout for the cart 204 using the current contents of the cart, as represented in the database 224. The checkout process can include, for example, a user verifying his/her intent to checkout based on the current cart contents and price summary, and user selection of a preexisting payment method (stored in the accounts database 222). the computer system 216 receiving FIG. 4 is a conceptual diagram of an example system 400 for associating an example mobile computing device 402 with an example shopping cart 404 over a local network 428. The mobile computing device 402 can be similar to the mobile computing devices 102 and 202 described above with regard to FIGS. 1-3, and the shopping cart 404 can be similar to the shopping carts 104 and 204 described above with regard to FIGS. 1-3. The computer system 416 can similar to the computer system 216, and can be any of a variety of appropriate computer systems, such as a remote cloud-based server system, a store-based computer system, and/or combinations thereof.

The example system 400 is similar to the example system 200 described above with regard to FIG. 2, but with the example system 400 the association between the mobile computing device 402 and the shopping cart 404 is established, at least in part, based on an communication over the local network 428 between the mobile computing device 402 and shopping cart 404. The local network 428 can be any of a variety of communication networks between mobile computing device 402 and the cart 404, such as a BLUETOOTH pairing (e.g., BLE pairing), a Wi-Fi Direct connection, an NFC connection, connections to a common local wireless network (e.g., both the mobile computing device 402 and the cart 404 connected to the same Wi-Fi network), wired connections between the computing device 402 and the cart 404 (e.g., tethered connection, such as a wired USB connection), and/or combinations thereof.

Like the cart 204, the shopping cart 404 includes a system 406 to provide product detection and device association features. The system 406 includes a product detection system 408 to detect products that are placed in and/or removed from the cart 404 (similar to the product detection systems 106 and 208 described above with regard to FIGS. 1-3), a wireless transceiver 410 (similar to the wireless transceiver 210 described above with regard to FIGS. 2-3) to wirelessly transmit and receive information, and a power source 412 (similar to the power source 212) to supply power to the product detection system 408 and the wireless transceiver 410. In some instances, the system 406 can further include a cart identifier 414 that uniquely identifies the cart 404. The cart identifier 414 can be, for example, a value that is wirelessly detectable by the mobile computing device 402, such as an RFID tag that is embedded in the cart 404, an identifier that is wirelessly transmitted by the cart 404 (e.g., transmitted via wireless beacon, transmitted via NFC connection), and/or other wireless transmission techniques.

With the system 400, the association between the cart 404 and the computing device 402 can be established based on transmission of data between the computing device 402 and the cart 404. For example, the product detection system 408 can be a barcode scanner that is attached to cart 404 and that can be paired over the local network 428 to the mobile computing device 402 using the wireless transceiver 410. The pairing, in some instances, can serve as the association between the mobile computing device 402 and the cart 404. In other instances, the cart 404 can use the pairing with the mobile computing device 402 over the local network 428 as a conduit to establish a cart-to-device association with the computer system 416. For example, the cart 404 may communicate with the computer system 416 by having the mobile device 402 effectively relay communication from the cart 404 to the computer system 416. The mobile computing device 402 can communicate with the computer system 416 over a third party network 426 (similar to the third party network 226). The computer system 416 can be similar to the computer system 216, and can maintain databases 418-424 (similar to databases 218-242) that can be used to manage cart-to-device associations and enhanced features related thereto.

Figure 5A:
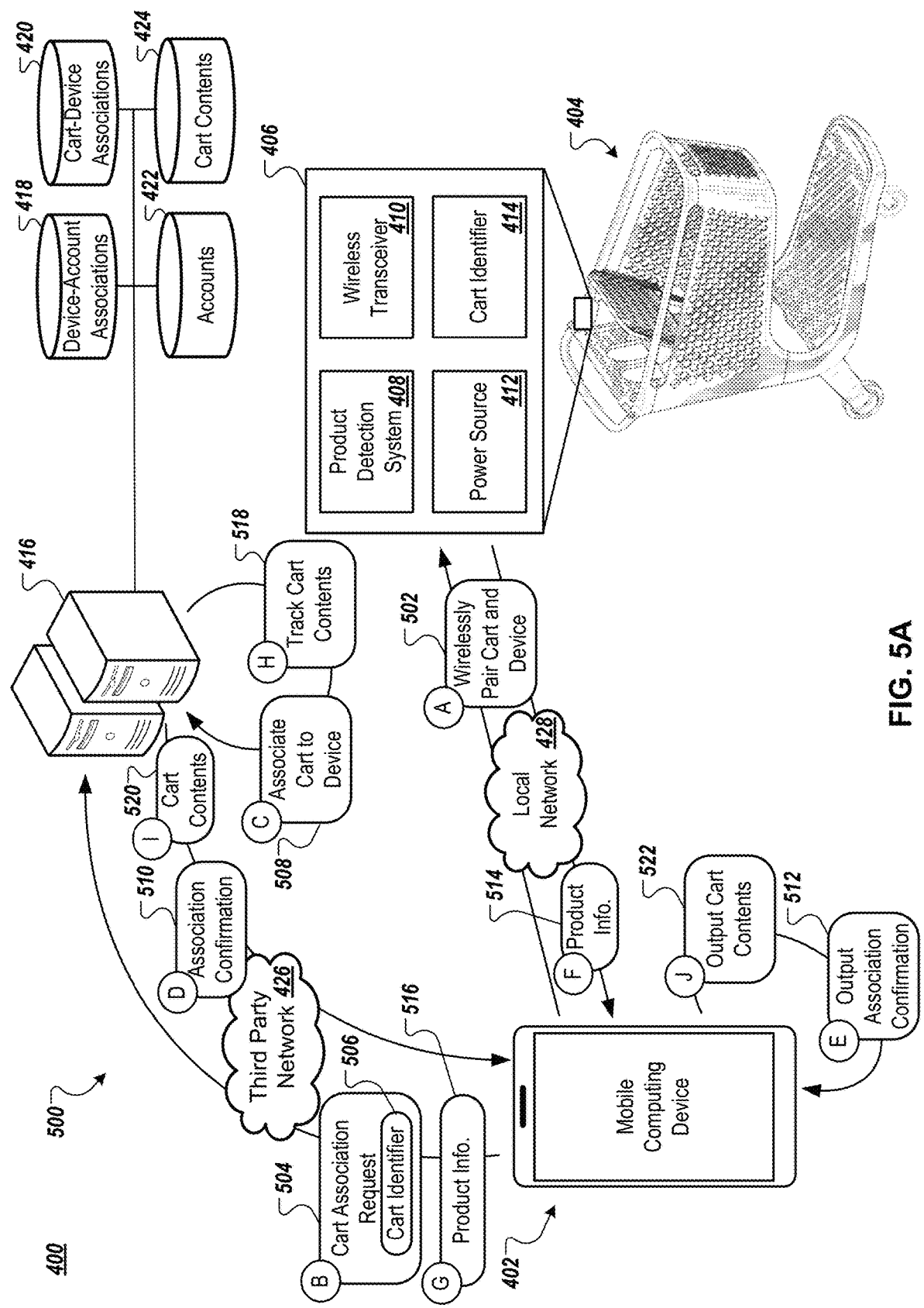
FIGS. 5A-B are example process flows for associating an example mobile computing device with an example shopping cart in the system depicted in FIG. 4.
Figure 5B:
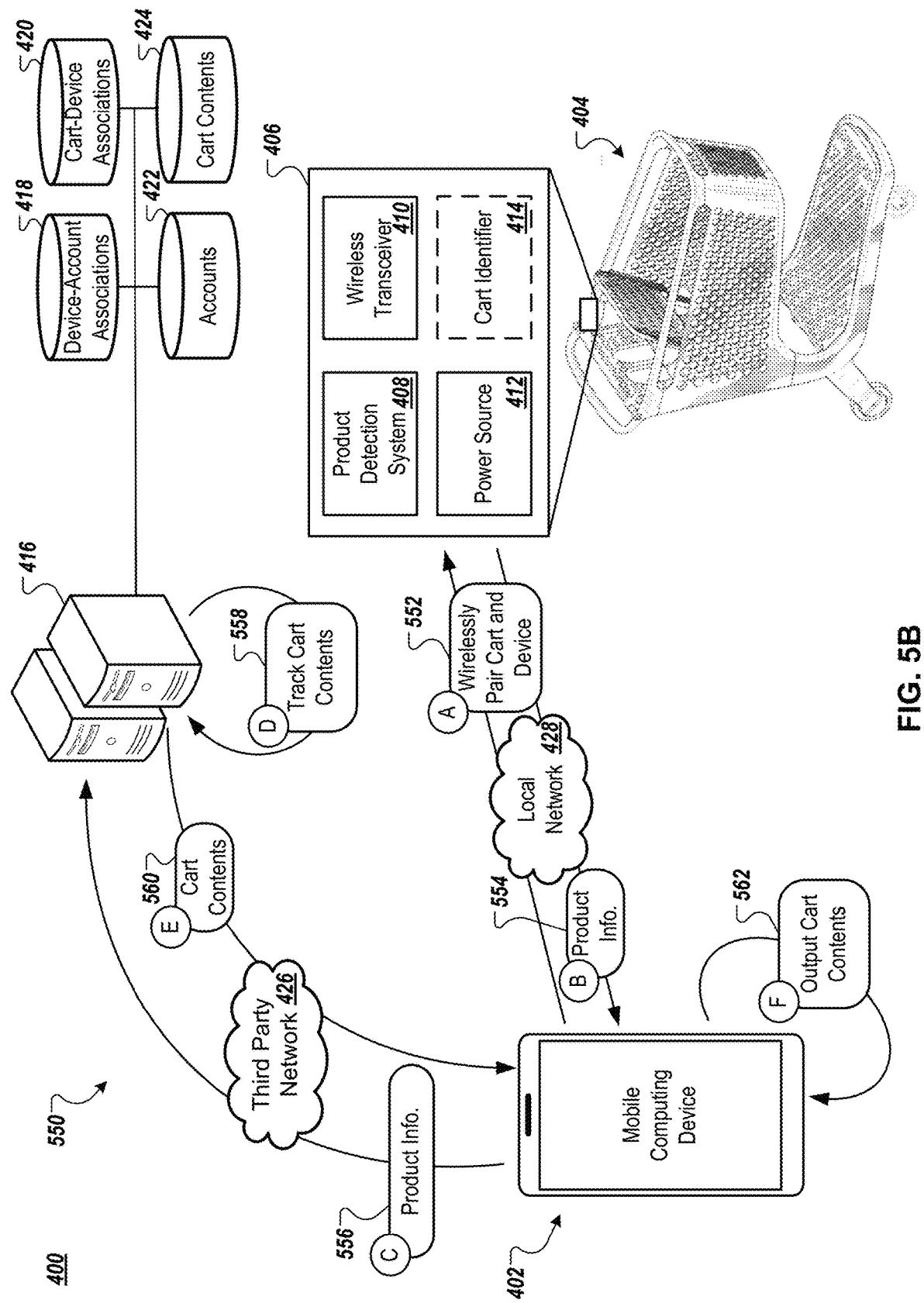

FIGS. 5A-B are example process flows 500 and 550 for associating the device 402 with the cart 404 in the system 400 depicted in FIG. 4.

Referring to FIG. 5A, the example process flow 500 in which the cart 404 is paired to the mobile computing device 402 over the local network 428 and the computer system 416 manages the cart-to-device association between the device 402 and the cart 404. As indicated by step A (502), the mobile computing device 402 and the cart 404's wireless transceiver 410 are wirelessly paired. Using this wireless pairing, the mobile computing device 402 obtains the cart identifier 414 from the cart 404, which the mobile computing device 402 transmits to the computer system 416 with a cart association request, as indicated by step B (504, 506). Similar to step C (308) in process flow 300, the computer system 416 checks whether it is able to associate the cart 404 with the device 402 using the databases 418-424 and, if it is able to make the association, proceeds with associating the cart 404 to the device 402, as indicated by step C (508). The association confirmation can be transmitted to the mobile computing device 402, as indicated by step D (510), and can be output on the mobile computing device 402, as indicated by step E (512).

Now that the mobile computing device 402 and the cart 404 are associated (and paired) with each other, the product detection system 408 can detect products that are placed in and/or removed from the cart 404, which can permit enhanced shopping cart features to be presented on the mobile computing device 402. Similar to step F (314) in the process flow 300, the product detection system 408 can obtain direct and/or indirect product information which, in process flow 500, is transmitted to the mobile computing device 402 over the local network 428, as indicated by step F (514). The mobile computing device 402 can retransmit the product information to the computer system 416, as indicated by step G (516) for the computer system 416 to determine and track the cart contents, similar to the computer system 216 in system 200. However, unlike the system 200, with the system 400 the product information is coming from the mobile computing device 402 instead of from the cart 404 itself. This configuration in system 400 can be beneficial in that it can permit the cart 404 and its wireless transceiver 410 to be shorter range and lower power, which can cause the wireless transceiver 410 to consume less energy from the power source 412 (which can extend the duration of each battery charge, for example) and can cause the wireless transceiver 410 to be less expensive and less complicated to implement in the cart 404. However, the wireless pairing between the mobile computing device 402 and the cart 404 may restrict the flexibility and mobility of a user and his/her device 402 relative to the cart 404 so as to avoid breaking the wireless pairing. Similar to the steps G-I (316-320) in the process flow 300, the computer system 416 can track the contents of the cart 404 and transmit updates on the cart contents to the mobile computing device 402, which can output the cart contents, as indicated by steps H-J (518-522).

Referring to FIG. 5B, the example process flow 550 is similar to the process flow 500, but the process flow 550 has the pairing between the mobile computing device 402 and the cart 404 represent the cart-to-device association. This is in contrast to the process flow 500, which uses the cart-to-device pairing to obtain the cart identifier 414, but relies on the computer system 416 to manage and regulate cart-to-device associations. In the process flow 550, the cart identifier 414 is optional and, in some instances, may not be used as part of the pairing process. As a result, the process flow 550 can include a subset of the steps that are included in the process flow 500. For example, the process flow 550 includes pairing between the cart 404 and the device 402 (step A, 552), the cart 404 transmitting product information to the mobile computing device 402 (step B, 554), the mobile computing device 402 transmitting the product information to the computer system 416 (step C, 556), the computer system 416 tracking the cart contents (step D, 558), the cart contents being relayed back to the mobile computing device 402 (step E, 560), and the mobile computing device outputting the cart contents (step F, 562).

The process flows 500 and 550 can both include additional enhanced features that are not depicted, including permitting a user to checkout the cart 404 on the mobile computing device 402, as described above with regard to the process flow 300. Other enhanced features are also possible.

Figure 6B:
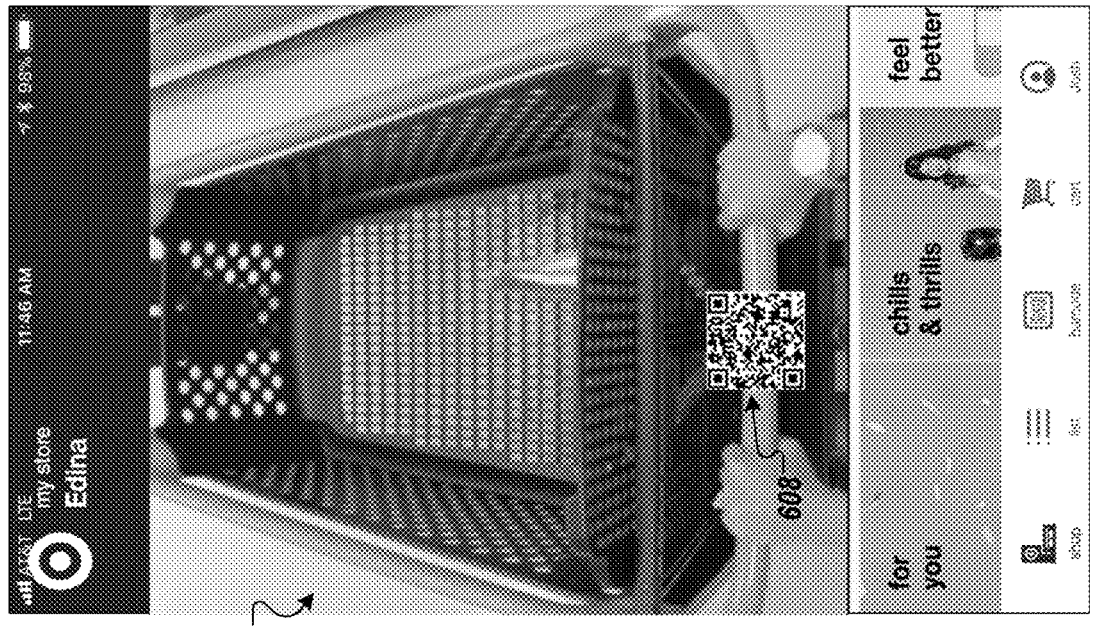
FIGS. 6A-C are screenshots of an example mobile app running on a mobile computing device to establish a cart-to-device association.
Figure 6A:
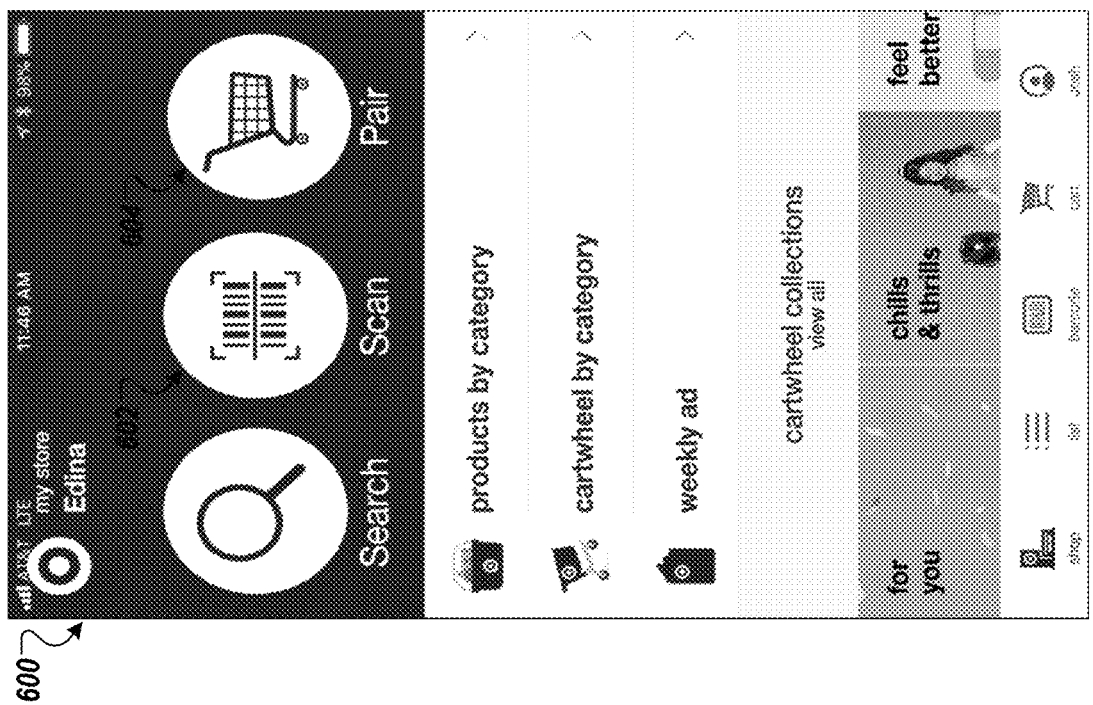
Figure 6C:
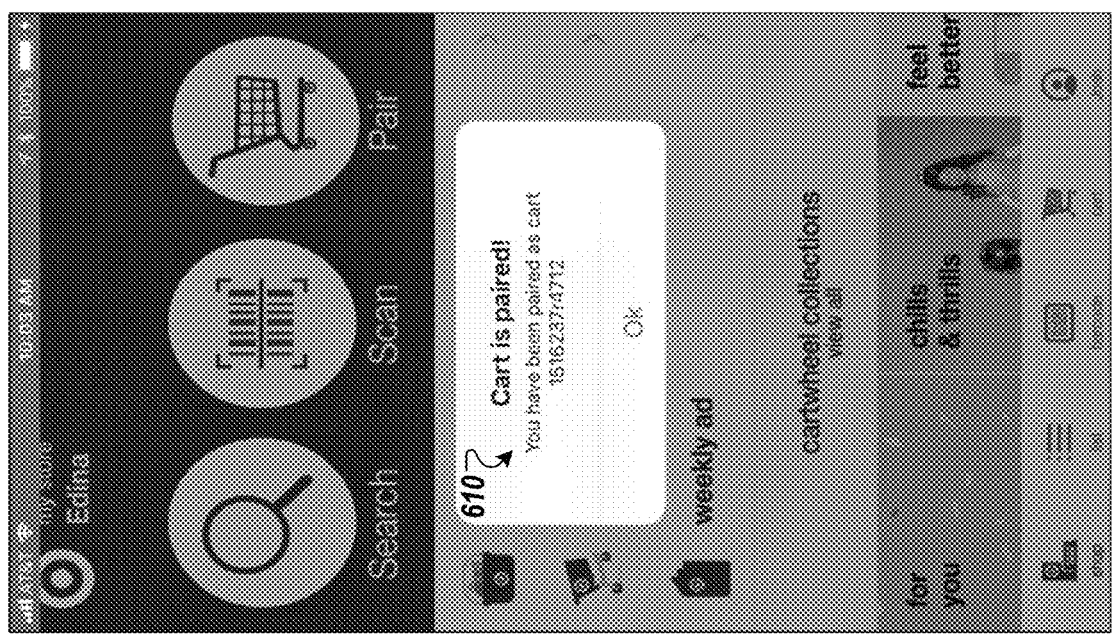

FIGS. 6A-C are screenshots of an example mobile app running on a mobile computing device to establish a cart-to-device association. The example screenshots and the mobile app can run on any of a variety of mobile computing devices, such as the mobile computing device 102, 202, and/or 402 described above with regard to FIGS. 1-5.

Referring to FIG. 6A, a first screenshot of a user interface 600 is presented for associating a mobile computing device with a shopping cart. The user interface 600 includes several features, including a barcode scanning feature 602 (represented by a selectable icon/button) that a user can select to manually scan products using the mobile device. For example, the barcode scanning feature 602 can activate one or more on device cameras (or other associated cameras, such as camera's in other devices that are paired to the mobile computing device). Another feature presented in the user interface 600 is a cart pairing feature 604 that is selectable to initiate a process to associate the mobile computing device with a shopping cart.

Referring to FIG. 6B, in response to a user selecting the pair 604 feature the mobile computing device activates the camera (or other camera associated with the mobile computing device) and presents a camera view 606 in the user interface. The camera view 606 can assist a user in locating a barcode 608 on a shopping cart. Once a sufficiently clear image of the barcode 608 has been obtained by the mobile computing device (e.g., image processing and barcode scanning techniques can be used to determine when the contents of the barcode 608 have been accurately read and identified), the mobile computing device can provide confirmation to the user. Additionally, once the barcode 608 has been read (and the cart identifier obtained), the mobile computing device can initiate a pairing process, such as the pairing process 300 involving transmission of the cart identifier (represented by the barcode 608) to a remote server system.

Referring to FIG. 6C, the user interface can present confirmation 610 that the cart with the barcode 608 has been associated with the mobile computing device. For example, the confirmation 610 includes a unique identifier (e.g., cart identifier) for the cart, which may be visually printed somewhere on the cart so that the user can verify that association was correct.

Figure 7:
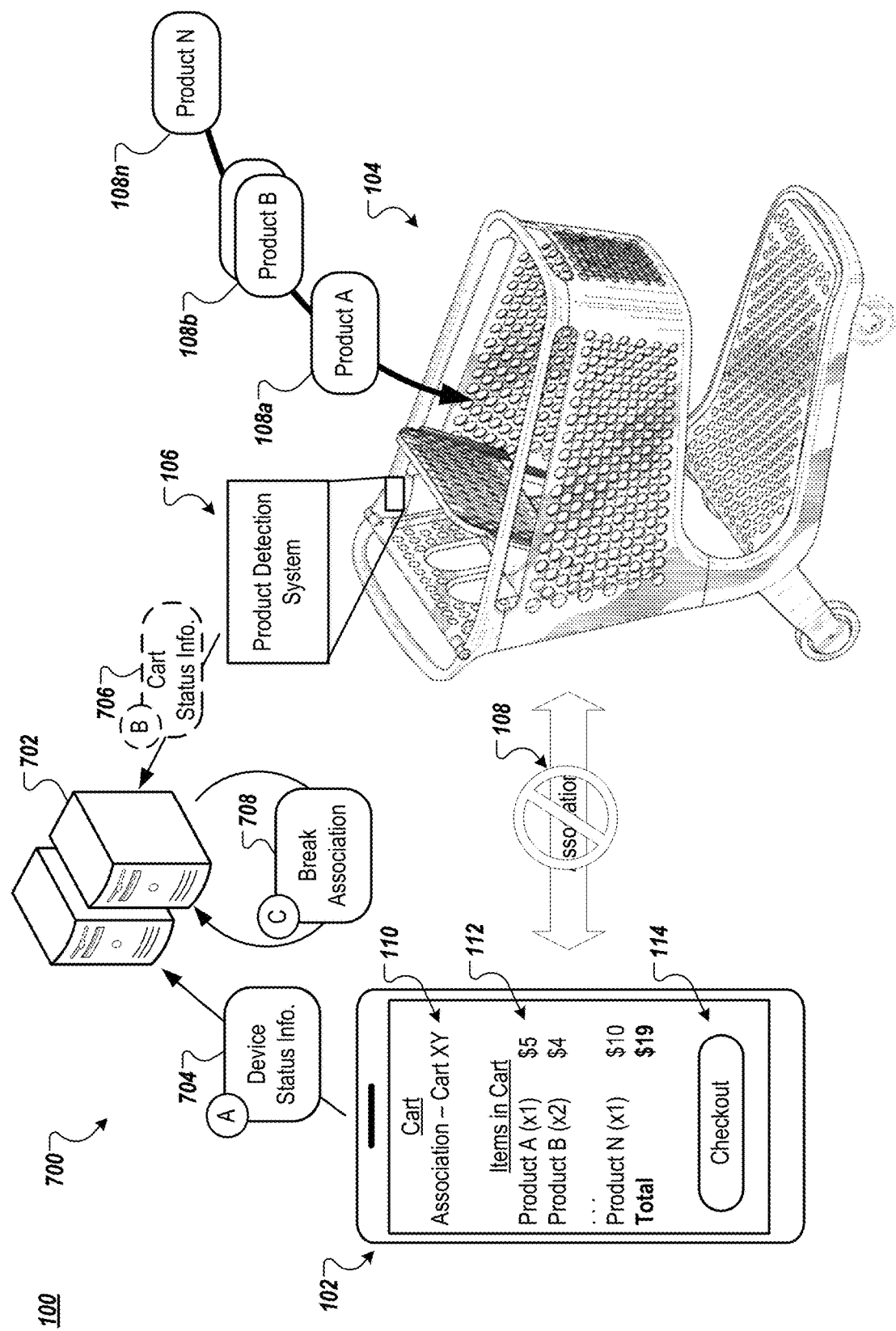
FIG. 7 is a diagram of a conceptual system in which a cart-to-device association is broken.

FIG. 7 is a diagram of a conceptual system 700 in which a cart-to-device association is broken. The example system 700 includes the components of system 100 described above with regard to FIG. 1, with an additional computer system 702, which can manage the cart-to-device associations, similar to the computer systems 216 and 416 described above with regard to FIGS. 2-5.

At step A (704), the mobile computing device 102 transmits status information to the computer system 702. The status information includes, for example, a current geographic location of the device 102, a current location within a store for the device 102, a binary value indicating whether the mobile computing device 102 is located within a bounded geographic area associated with a store, movement information (e.g., information indicating whether the device 102 is or has been moving), mobile app focus information (e.g., information indicating whether a cart mobile app has focus on the device's display), information on a checkout process (e.g., selection of the checkout feature 114), and/or others. In some implementations, cart status information is also transmitted by the computer system 702, as indicated by step B (706). Cart information can include, for example, information on a current location of the cart 104 (e.g., location within a store, geographic location), information indicating whether the cart 104 is located within or outside of a store, movement information (e.g., motion sensor information), information on nearby wireless devices (e.g., detected wireless signals), and/or other information.

The computer system 702 can process the device information and/or the cart status information to determine whether to break the association 108 between the device 102 and the cart 104. Any of a variety of appropriate conditions and scenarios can cause the association 108 to be broken, including a checkout process having been completed, the mobile computing device 102 having left a bounded geographic area (e.g., geographic area around the store and its parking lot, geographic area around the store's perimeter), the cart 104 and the device 102 having been separated from each other for at least a threshold period of time (e.g., more than 1 hour, more than 2 hours), a request from the mobile computing device 102 to be associated with another cart, and/or other events. The computer system 702 can be programmed to provide for a wide variation in the conditions permitting associations to be maintained and, unless there is a clear indication that the association should be broken (e.g., checkout process completed), can maintain the association. For example, it can be time consuming to travel around a store, to collect items, and to ensure that they are properly detected by a product detection system 106. By maintaining associations unless there is a clear indication to the contrary, the computer system 706 can help users preserve and resume all of that effort.

Figure 8:
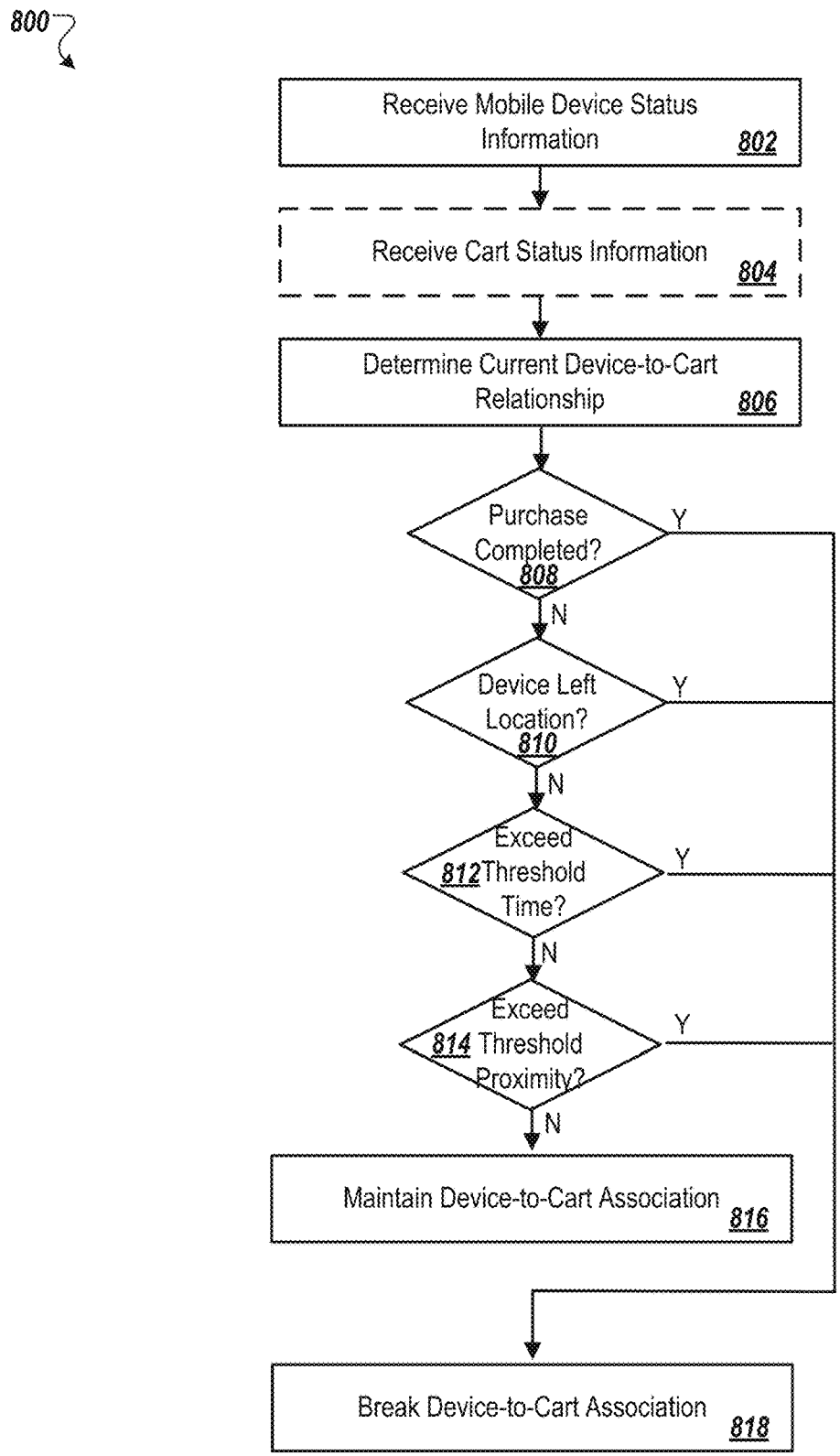
FIG. 8 is a flowchart of an example process for determining whether a cart-to-device association should be broken.

FIG. 8 is a flowchart of an example process 800 for determining whether a cart-to-device association should be broken. The example process 800 can be performed by any of a variety of appropriate computing devices, such as the computer system 702 described above with regard to FIG. 7.

Mobile device status information can be received (802) and, in some implementations, cart status information can also be received (804). Using the status information, a determination can be made as to the current device-to-cart relationship (806). For example, a determination can be made as to what the physical relationship is (e.g., near each other, far away from each other, device left bounding box around store), functional relationship (e.g., cart still receiving products, device going through a checkout process, checkout process completed), a temporal relationship (e.g., device and cart interacting with each other frequently and recently, device and cart interactions separated from each other by time), and/or others. Using the relationship information, the computer system can determine whether any of a variety of conditions have occurred that would cause the association to be broken (818), such as a purchase having been completed (808), the mobile device having physically left a location (810) (e.g., left area of the store where the cart is located, left the physical boundary of the store, left a geographic area around the store and including the store's parking lot), a threshold amount of time having been exceeded (812) (e.g., timer elapsed since the device and cart were near each other), and/or a threshold proximity to each other having been exceeded (814) (e.g., device and cart are separated from each other by greater than a threshold distance). If none of those conditions (and/or other conditions indicating that the association should be broken) are met, then the association can be maintained (816).

Figure 9:
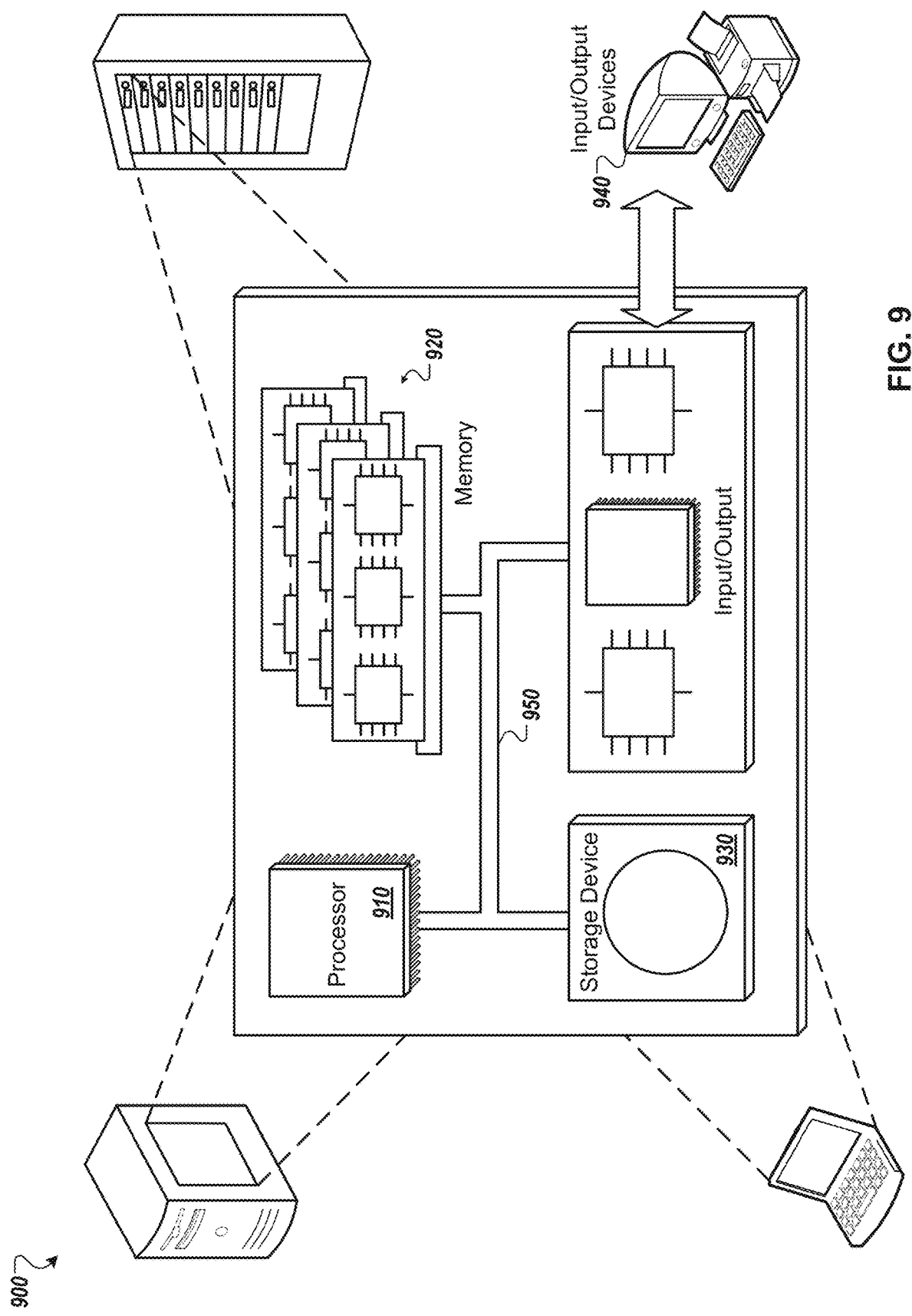
FIG. 9 is a schematic diagram that shows an example of a computing system.

FIG. 9 is a schematic diagram that shows an example of a computing system 900. The computing system 900 can be used for some or all of the operations described previously, according to some implementations. The computing system 900 includes a processor 910, a memory 920, a storage device 930, and an input/output device 940. Each of the processor 910, the memory 920, the storage device 930, and the input/output device 940 are interconnected using a system bus 950. The processor 910 is capable of processing instructions for execution within the computing system 900. In some implementations, the processor 910 is a single-threaded processor. In some implementations, the processor 910 is a multi-threaded processor. The processor 910 is capable of processing instructions stored in the memory 920 or on the storage device 930 to display graphical information for a user interface on the input/output device 940.

The memory 920 stores information within the computing system 900. In some implementations, the memory 920 is a computer-readable medium. In some implementations, the memory 920 is a volatile memory unit. In some implementations, the memory 920 is a non-volatile memory unit.

The storage device 930 is capable of providing mass storage for the computing system 900. In some implementations, the storage device 930 is a computer-readable medium. In various different implementations, the storage device 930 may be a floppy disk device, a hard disk device, an optical disk device, or a tape device.

The input/output device 940 provides input/output operations for the computing system 900. In some implementations, the input/output device 940 includes a keyboard and/or pointing device. In some implementations, the input/output device 940 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

What is claimed is:

1. A system for providing and managing associations between users and physical shopping carts used in a retail store, the system comprising:
   a physical shopping cart with a product detection system that is configured to automatically identify products that are placed in the physical shopping cart;
   a display device with one or more cameras, wherein the display device is configured to initiate a shopping sessions for a user by obtaining an image of an encoded identifier using the one or more cameras and establishing an association between the physical shopping cart and the user based on the encoded identifier, wherein the display device is further configured to output a user interface that provides a real-time summary of the products in the physical shopping cart once the association between the physical shopping cart and the user has been established;
   a remote server system to manage associations between a plurality of physical shopping carts and a plurality of users, wherein the remote server system includes an association database that stores current associations between the plurality of physical shopping carts and the plurality of users, wherein the plurality of physical shopping carts includes the physical shopping cart and the plurality of users includes the user;
   wherein the display device is programmed to:
      receive, from the user, a request to establish an association between the user and the physical shopping cart, wherein the request includes the encoded identifier, the encoded identifier identifying the physical shopping cart,
      poll the association database of the remote server system for association data corresponding to the encoded identifier,
      determine, based on the association data, whether the encoded identifier is used for an existing association between the physical shopping cart and another user, the another user being different than the user,
      generate and transmit a notification to the another user based on a determination that the encoded identifier is used for the existing association between the physical shopping cart and the another user, wherein the notification prompts the another user to consent to breaking the existing association between the physical shopping cart and the another user, and
      based on (i) the another user providing user input indicating consent to break the existing association or (ii) a threshold amount of time passing without the another user providing the user input, automatically break the existing association between the physical shopping cart and the another user and establish the association between the user and the physical shopping cart;

wherein the display device is further programmed (i) to perform a checkout process for the products in the physical shopping cart based on the association between the physical shopping cart and the user, and (ii) to output verification information upon successful checkout of the products in the physical shopping cart, the verification information being configured to be accessed by a store exit monitoring system within the retail store to permit the user to leave the retail store without using a point of sale terminal.

2. The system of claim 1, wherein:

the remote server system further stores preapproved payment information for the plurality of users that is processed as part of the checkout process, and performing the checkout process comprises receiving an indication that a checkout is being performed for the physical shopping cart, retrieving an identifier for the user based on the association between the physical shopping cart and the user, accessing preapproved payment information for the user based on the identifier, and processing payment for the products in the physical shopping cart using the preapproved payment information for the user.

3. The system of claim 1, wherein the store exit monitoring system is configured to automatically verify the verification information to permit the user to leave the retail store without using the point of sale terminal.

4. The system of claim 3, wherein the store exit monitoring system is positioned at or near an exit from the retail store.

5. The system of claim 1, wherein the encoded identifier comprises a QR code.

6. The system of claim 1, wherein the encoded identifier comprises a barcode.

7. The system of claim 1, wherein:

the remote server system further includes a cart contents database that stores product records of products that are currently contained in each of the plurality of physical shopping carts, the physical shopping cart further includes a wireless transceiver to transmit product information for the products detected by the product system to the remote server system.

8. The system of claim 7, wherein:

the remote server system is further programmed (i) to identify the products contained in the physical shopping cart using the product information, (ii) to update the product records for the physical shopping cart based on the identified products, and (iii) to transmit current cart contents for the physical shopping cart to the display device, the display device is further programmed (i) to receive the current cart contents from the remote server system and (ii) to update the real-time summary of the products in the physical shopping cart in the user interface using the current cart contents received from the remote server system.

9. The system of claim 8, wherein the real-time summary includes (i) graphical elements identifying the products that are currently contained in the physical shopping cart, quantities of the products, and prices of the products, and (ii) a graphical element providing a total price for the products contained in the physical shopping cart.

10. The system of claim 9, wherein:

the user interface further includes a selectable element to checkout on the mobile computing device for the products contained in the physical shopping cart, and selection of the selectable element causes the mobile computing device to initiate a checkout process with the remote server system and, once the checkout process has been completed, to output a checkout confirmation on the mobile computing device to verify that payment for the products contained in the physical shopping cart has been received by the remote server system.

11. The system of claim 10, wherein at least some of the product information is provided to the remote server system without a confirmed product identification and the remote server system processes the product information to determine an accurate product identification.

12. The system of claim 1, wherein:

the remote server system is further programmed (i) to receive status information for the physical shopping cart and (ii) to break the association between the user and the physical shopping cart based on analysis of the status information.

13. The system of claim 12, wherein breaking the association causes the association to be removed from the association database and for product information for products contained in the physical shopping cart to no longer be transmitted by the remote server system to the display device.

14. The system of claim 13, wherein the display device is programed to, based on removing the association from the association database, receive and output a confirmation that the association has been broken between the user and the physical shopping cart.

15. The system of claim 14, wherein the confirmation output by the display device indicates that the physical shopping cart is free to be associated with another user.

16. The system of claim 1, wherein the association is established by the remote server system without communication between a mobile computing device of the user and the physical shopping cart.

17. The system of claim 1, wherein the association is established by the remote server system further based on wireless communication between a mobile computing device of the user and the physical shopping cart.

18. The system of claim 1, wherein:

the physical shopping cart comprises a retail shopping cart that includes wheels, a product basket or bin, and a handle, wherein the product detection system automatically detects products that are placed in the physical shopping cart and comprises a collection of one or more of the following: sensors, cameras, and scanners.

19. The system of claim 1, wherein the product detection system is manually operated and comprises a barcode scanner device that is tethered to the physical shopping cart.

* * * * *